United States Patent [19]

Hiles

[11] 4,025,102
[45] May 24, 1977

[54] VEHICLE AND CAMPER ASSEMBLY

[76] Inventor: Phillip L. Hiles, Rte. 1, Box 77, Andrews, Ind. 46702

[22] Filed: Oct. 8, 1975

[21] Appl. No.: 620,568

[52] U.S. Cl. .......................................... 296/23 MC
[51] Int. Cl.² .......................................... B60P 3/34
[58] Field of Search ...................... 296/23 MC, 23 R

[56] References Cited

UNITED STATES PATENTS

| | | | |
|---|---|---|---|
| 3,123,393 | 3/1964 | Markwick | 296/23 MC |
| 3,488,083 | 1/1970 | Ratcliff | 296/23 R |
| 3,544,152 | 12/1970 | Low | 296/23 R |
| 3,567,272 | 3/1971 | Low | 296/23 R |
| 3,637,251 | 1/1972 | Plant | 296/23 MC |
| 3,767,252 | 10/1973 | Hathaway | 296/23 MC |

*Primary Examiner*—Joseph F. Peters, Jr.
*Assistant Examiner*—Gene A. Church

[57] ABSTRACT

A vehicle and camper assembly is provided in which the vehicle includes a top and back opening extending from the top of the windshield, rearwardly intermediate of the pair of side doors and sidewalls, and both rearwardly and downwardly proximal to the floor at the rear of the vehicle.

The camper includes a pair of longitudinally disposed and spaced-apart bunks. An open space on the floor of the vehicle between an operator's seat and the distal side door, the top and back opening in the vehicle, and the space between the longitudinally disposed bunks cooperate to provide means for walking from the operator's seat, intermediate of the bunks, toward the rear of the vehicle.

4 Claims, 12 Drawing Figures

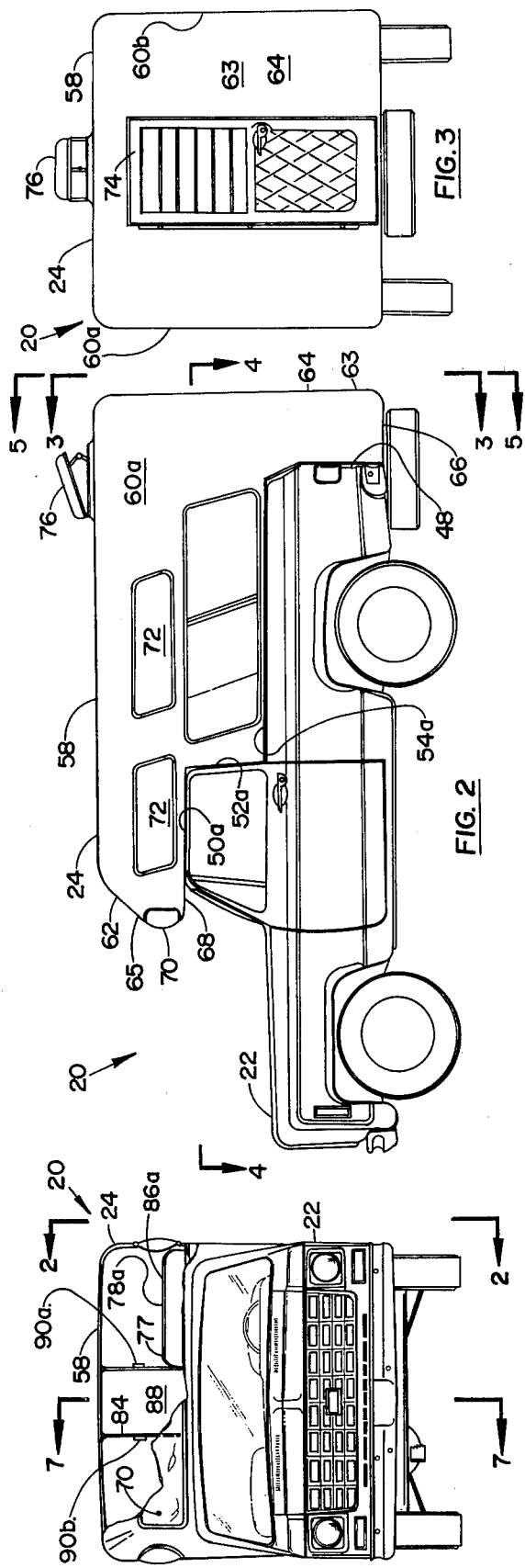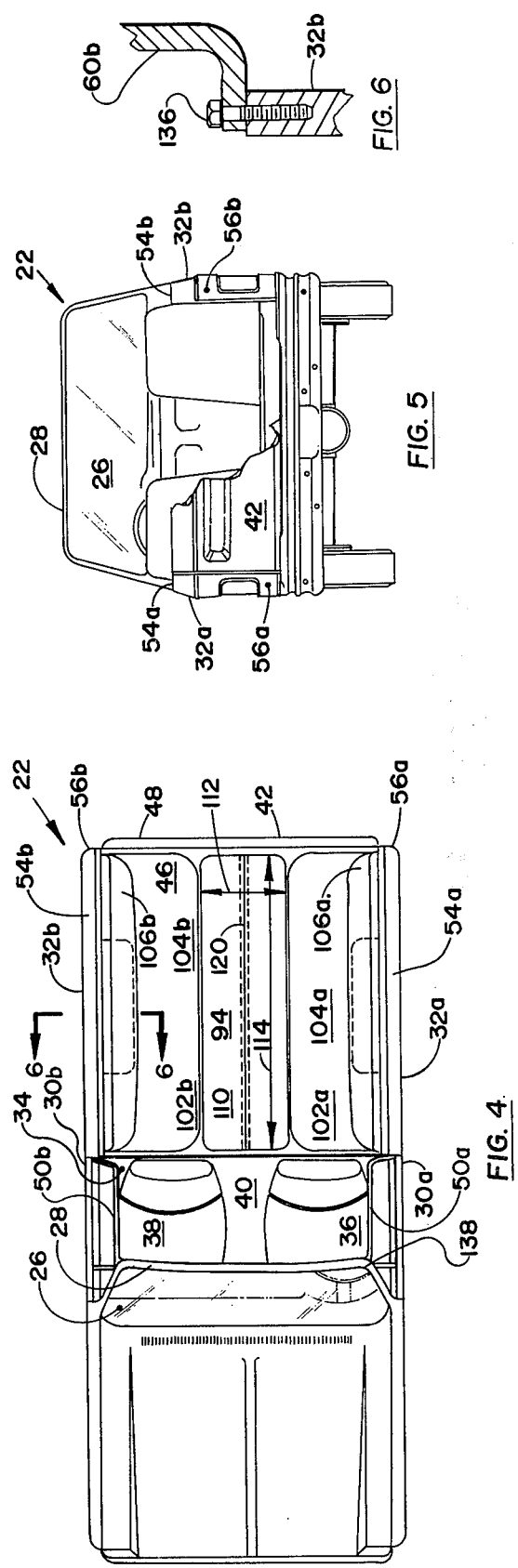

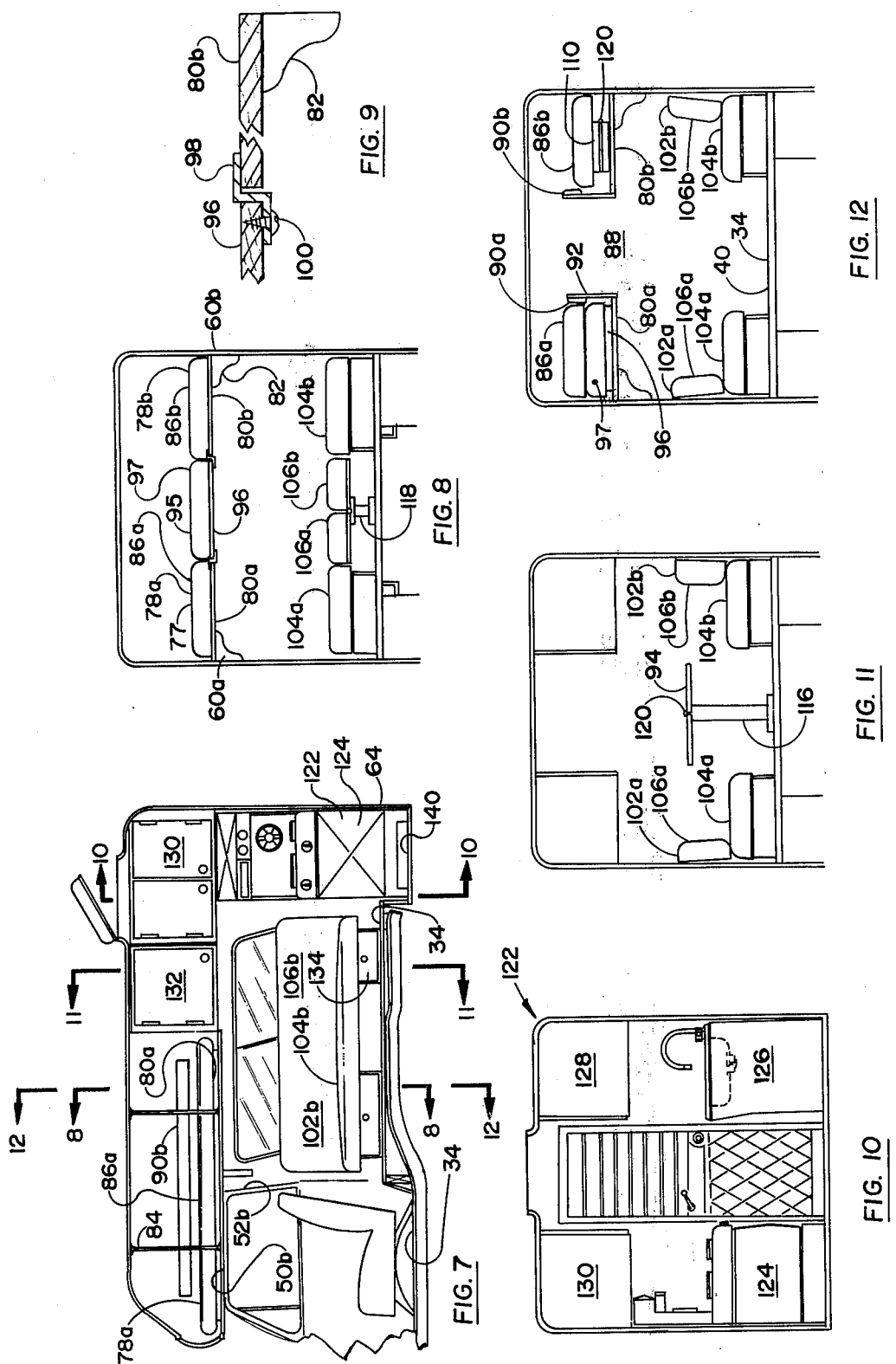

VEHICLE AND CAMPER ASSEMBLY

BACKGROUND OF THE INVENTION

1. Field of the Invention

This invention relates generally to recreational vehicles, and more particularly to a vehicle and camper assembly in which the vehicle is of the type having a removable top over a seating area and a cargo area.

2. Description of the Prior Art

Two types of recreational vehicles have been popular in recent years in which the vehicle has been self-propelled and has included living quarters or at least sleeping quarters. One of these types of recreational vehicles has been the housecar in which a motorized chassis is fitted with permanently installed living quarters. The other of these types of recreational vehicles has been the pickup and camper assembly in which a camper assembly is removably attached to the bed of a pickup truck to provide living quarters or, at least, sleeping quarters. Camper modules for use with pickup trucks have traditionally incorporated a door proximal to the rear of the pickup truck for access to the camper module; and usually this door has been the only means of access to the camper module. However, in improved designs, there has been a window opening between the cab of the pickup and the camper module. One pickup and camper assembly showing viewing and speaking access between the camper module and the cab of the pickup is disclosed in U.S. Pat. No. 3,625,560, issued to Bjork.

SUMMARY OF THE INVENTION

In accordance with the broader aspects of this invention, there is provided a vehicle and camper assembly which includes a self-propelled vehicle and a removably attachable camper module.

The vehicle is self-propelled and is of the type which includes a windshield for forward viewing, a pair of side doors each being disposed proximal and rearward of the windshield and each having a window in the upper portion for sideward viewing, a pair of sidewalls extending rearwardly from the side doors at a height substantially equal to the top of the windows, a floor intermediate of the side doors and sidewalls and extending rearwardly proximal to the rear of the vehicle, an operator's seat being proximal to one of the side doors, an open space on the floor being intermediate to the operator's seat and the other of the side doors including floor space centered between the side doors.

The vehicle also includes a top and back opening starting proximal to the top of the windshield, extending rearwardly intermediate of the tops of the side doors, extending downwardly from the tops of the side doors to the tops of the sidewalls, extending rearwardly along the tops of the sidewalls, and extending downwardly at the rear of the sidewalls to the floor.

The camper body module includes a substantially horizontal top portion being in spaced-above relationship to the top of the side doors and the windshield, a pair of wall portions sealingly engaging the vehicle proximal to respective tops of the side doors and respective tops of the sidewalls and extending upwardly therefrom in attached engagement with respective sides of the top portion, a front portion sealingly engaging the vehicle proximal to the top of the windshield and being attached to both the top portion and the wall portions, a rear wall sealingly enclosing the rear of the camper module and sealingly engaging the vehicle proximal to the rear of the vehicle, and bolts for removably attaching the camper body module to the vehicle.

The camper body module also includes a pair of horizontally and longitudinally disposed bunks being positioned vertically in spaced-below relationship to the top portion and being disposed vertically proximal to the top of the windshield. The bunks are positioned proximal to respective ones of the wall portions to provide a longitudinal space therebetween.

Thus an open space on the floor of the vehicle intermediate of the side doors, the top and back openings of the vehicle, and the longitudinal space between the bunks all cooperate to provide means for walking from the operator's seat, intermediate of the bunks, toward the rear of the vehicle.

It is a first object of the present invention to provide a camper module for vehicles of the type having a top and back opening extending rearwardly from the top of the windshield proximal to the rear of the vehicle.

It is a second object of the present invention to provide a removable camper module having a pair of longitudinally disposed spaced-apart bunks for vehicles of the type having a top and back opening extending rearwardly from the top of the windshield proximal to the rear of the vehicle.

It is a third object of the present invention to provide a vehicle and camper assembly in which the camper module thereof is removable, the camper module includes a pair of longitudinally disposed and spaced-apart bunks, and means is provided for walking intermediate of the bunks rearwardly toward the rear of the vehicle.

The abovementioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings:

FIG. 1 is a front view of the vehicle and camper assembly with a portion of the camper module broken away to disclose inner construction details thereof;

FIG. 2 is a side view of the vehicle and camper assembly of FIG. 1, taken substantially as shown by view line 2—2 of FIG. 1;

FIG. 3 is a rear view of the vehicle and camper assembly taken substantially as shown by view line 3—3 of FIG. 2;

FIG. 4 is a top view of the vehicle with the camper module removed, taken substantially as shown by view line 4—4 of FIG. 2;

FIG. 5 is a rear view of the vehicle with the camper module removed, taken substantially as shown by view line 5—5 of FIG. 2;

FIG. 6 is an enlarged and rotated partial cross-section of the vehicle camper assembly, showing means for removably attaching the camper module to the vehicle, taken substantially as shown by section line 6—6 of FIG. 4;

FIG. 7 is a longitudinal cross-section of the vehicle and camper assembly taken substantially as shown by section line 7—7 of FIG. 1;

FIG. 8 is a transverse cross-section of the vehicle and camper assembly taken substantially as shown by section line 8—8 of FIG. 7;

FIG. 9 is a partial and enlarged cross-section of FIG. 8 showing means for removably supporting the third bunk means;

FIG. 10 is a transverse cross-section of the vehicle and camper assembly taken substantially as shown by section line 10—10 of FIG. 7;

FIG. 11 is a transverse cross-section of the vehicle and camper assembly taken substantially as shown by section line 11—11 of FIG. 7, showing the dining table positioned for use; and FIG. 12 is a transverse cross-section of the vehicle and camper assembly taken substantially as shown by section line 12—12, showing the third bunk and the table top in stored positions above the other two bunks.

DESCRIPTION OF THE PREFERRED EMBODIMENT

Referring now to the drawings, and more particularly to FIGS. 1 – 3, a vehicle and camper assembly, being generally depicted at 20, includes a self-propelled vehicle 22 and a camper module 24.

Referring now to FIGS. 4 and 5, the self-propelled vehicle 22 includes a windshield 26 having a top 28, a pair of side doors 30a and 30b, a pair of sidewalls 32a and 32b, a floor 34 which is more clearly seen in FIG. 7, an operator's seat 36 being attached to the floor 34 proximal to the side door 30a, a passenger's seat 38 being attached to the floor 34 proximal to the side door 30b, an open space 40 which comprises a portion of the floor 34 intermediate of the operator's seat 36 and side door 30b, and a tailgate 42 which may be folded down rearwardly about a gate hinge (not shown) proximal to the floor 34 or which may be removed from the vehicle 22.

The self-propelled vehicle 22 includes a top and back opening 46 which extends rearwardly from the top 28 of the windshield 26 intermediate of the side doors 30a and 30b and the sidewalls 32a and 32b proximal to the rear 48 of the vehicle. With the tailgate 42 rotated rearwardly and downwardly about the gate hinge, or with the tailgate 42 removed, the top and back opening 46 is generally defined by the top 28 of the windshield 26, tops 50a and 50b (FIGS. 2 & 7) of the side doors 30a and 30b, backs 52a and 52b (FIGS. 2 & 7) of the side doors 30a and 30b, tops 54a and 54b (FIGS. 2, 4 & 5) of the sidewalls 32a and 32b, backs 56a and 56b of the sidewalls 32a and 32b, and the portion of the floor 34 intermediate of the sidewalls 32a and 32b and proximal to the backs 56a and 56b thereof.

Referring again to FIGS. 1 – 3, the camper module 24 includes a top portion 58, a pair of wall portions 60a and 60b, a front portion 62, and rear wall means 63 which comprises a rear wall portion 64. The rear wall portion 64 is optionally positioned rearwardly from the rear 48 of the vehicle 22; so that the rear wall means 63 optionally includes a bottom portion 66 that extends forward from the rear wall portion 64 to the vehicle 22. The front portion 62 is optionally positioned forward of the top 28 of the windshield 26; so that a front wall means 65 includes the front portion 62 and a horizontal portion 68. The camper module 24 additionally includes a front window 70, side windows 72, a rear door 74, and a skylight and ventilating hatch 76.

Referring now to FIGS. 1, 7, and 8, sleeping bed means 77 is provided which comprises a pair of horizontally and longitudinally disposed bunks 78a and 78b. The bunks 78a and 78b comprise a pair of support platforms 80a and 80b which are supportably mounted to respective ones of the wall portions 60a and 60b by a plurality of support brackets 82 and which optionally may receive additional support from a plurality of support rods 84 as shown in FIGS. 1 and 7. The bunks 78a and 78b further comprise a pair of resilient pads 86a and 86b which are supportably received by the support platforms 80a and 80b.

Referring now to FIGS. 1, 7, and 12, a longitudinal space 88 exists between the spaced-apart bunks 78a and 78b. A pair of guard rails 90a and 90b may optionally be placed intermediate of the longitudinal space 88 and respective ones of the bunks 78a and 78b to prevent a sleeping person from rolling off of one of the bunks 78a or 78b. The guard rails 90a and 90b may be supportedly attached to respective ones of support rods 84 as shown in FIG. 1, or they may be supportably attached to respective ones of the support platforms 80a and 80b by a plurality of cantilever rods 92 as shown in FIG. 12.

Referring now to FIGS. 4, 11, and 12, it can be seen that the open space 40 of the floor 34 extends to the rear 48 of the vehicle 22 when a dining table means 94 of FIGS. 4 and 11 is removed as shown in FIG. 12. Thus the open space 40, extending rearwardly to the rear 48 of the vehicle 22, cooperates with the top and back opening 46 of the vehicle 22 and with the longitudinal space 88 of the camper module 24 to provide means for walking rearwardly from the operator's seat 36 to the rear 48 of the vehicle 22.

Referring now to FIGS. 8 and 9, a third bunk means 95 is provided which comprises a third support platform 96 and a third resilient pad 97. The third bunk means 95 further comprises means for removably supporting the third support platform 96 intermediate of the support platforms 80a and 80b. This means for removably supporting comprises portions that are greater in width than the longitudinal space 88; and these portions that are greater in width preferably comprise a plurality of support brackets 98 which are attached to the third support platform 96 by screws 100. The third support platform 96 and the third resilient pad 97 cooperate with the bunks 78a and 78b to provide a continuous sleeping surface intermediate of the wall portions 60a and 60b.

Referring now to FIGS. 4, 7, 11, and 12, the vehicle and camper assembly 20 includes a pair of longitudinally disposed seats 102a and 102b. The longitudinally disposed seats 102a and 102b include seat cushions 104a and 104b respectively and removable back cushions 106a and 106b respectively.

Referring now to FIGS. 4 and 11, the dining table means 94 comprises a substantially rectangular table top 110 having a width 112 which is substantially equal to the distance between the seat cushions 104a and 104b and a length 114 which is substantially equal to the length of the seat cushions 104a and 104b. The dining table means 94 further includes means for removably securing the table top 110 at a convenient eating height with respect to the longitudinally disposed seats 102a and 102b. The means for removably securing the table top 110 above the floor 34 includes a support post 116 which may be removably attached to the table top 110 and to the floor 34 by any suitable means, the method of attachment not being a part of the present invention.

Referring now to FIG. 8, the table top 110 has been lowered into a position to supportably receive the back cushions 106a and 106b into planar surface relationship with the seat cushions 104a and 104b and thereby to provide an auxiliary bed. A support rail 118 is provided as a means for removably supporting the table top 110 at a height for use in thus supporting the back cushions 106a and 106b.

Referring now to FIGS. 4, 11, and 12, the table top 110 includes a hinge 120 which preferably extends for the entire length 114 of the table top 110. The hinge 120 provides means for reducing one dimension of the table top 110 to facilitate storing of the table top. One location for storing of the table top 110 is above the support platform 80b as shown in FIG. 12.

Referring now to FIGS. 8 and 12, the third support platform 96 and the third resilient pad 97 may be stored above the support platform 80a when the third bunk means 95 is not being used.

Referring now to FIGS. 7 and 10, the camper module 24 includes kitchen means 122 which comprises a cooking unit 124, a sink unit 126, a cold storage unit 128, and a cabinet storage unit 130. The camper module 24 additionally includes storage units 132 and 134.

Finally, referring to FIG. 6, a plurality of bolts 136 are provided as a means for removably attaching the wall portions 60a and 60b of the camper module 24 to the sidewalls 32a and 32b of the vehicle 22.

In summary, the present invention provides a removable camper assembly in which a longitudinal walk space is provided from an operator's seat 36 rearwardly between a pair of longitudinally disposed bunks 78a and 78b. Optionally, the front portion 62 of the camper module 24 is extended forward over the top 28 of the windshield 26 by at least 6 inches beyond a rearmost point 138 of the top 28 of a curved windshield; and, preferably the bunks 78a and 78b are extended forward over the top 28 of the windshield 26 by at least 6 inches beyond the rearmost point 138 of the windshield 26 to provide additional space within the camper module 24. Preferably, the rear wall portion 64 is moved rearwardly to provide an extension deck 140 (FIG. 7) that extends from the floor 34 for a distance of at least eighteen inches. The extension deck 140 is preferably disposed at least 6 inches lower than the floor 34; and the kitchen means 122 is preferably disposed rearwardly of the longitudinally disposed seats 102a and 102b and within the space above the extension deck 140. The lowered position of the extension deck 140 is effective to provide better total height for placing the cold storage unit 128 and the cabinet storage unit 130 above respective ones of the sink unit 126 and the cooking unit 124.

While there have been described above the principles of this invention in connection with specific apparatus, it is to be clearly understood that this description is made only by way of example and not as a limitation to the scope of the invention.

What is claimed is:

1. In combination with a self-propelled vehicle comprising a body having front and rear ends and including a front-facing windshield assembly having a top edge, side door assemblies rearwardly of said windshield assembly and respectively on opposite sides thereof, said door assemblies respectively having top edges and rear edges, said door assembly top edges being generally extensions of said windshield assembly top edge, side walls respectively extending rearwardly from said rear edges of said door assemblies to said rear end and having top edges, the height of said side walls being substantially less than that of said door assemblies, a floor extending rearwardly between said door assemblies and side walls to said rear end, and an operator's seat on said floor adjacent one of said door assemblies, said windshield and door assemblies, side walls and floor defining a compartment extending continuously rearwardly between said door assemblies and side walls from said windshield assembly to said rear end and having an open top bounded by said edges; a camper body module removably supported on said vehicle body and comprising side walls respectively having edges sealingly engaging said door assembly and body side wall edges and extending upwardly therefrom, a top wall joining said camper side walls, a front wall joining said top wall and camper side walls and having an edge sealingly engaging said windshield assembly top edge, and a rear wall joining said top wall and camper side walls, said camper walls defining an upward extension of said compartment which extends continuously rearwardly between said camper side walls from said front wall to said rear wall thereby providing an uninterrupted space extending upwardly between said door assemblies and side walls to said top wall and rearwardly to said rear wall from said windshield assembly and front wall.

2. The combination of claim 1 further comprising means for removably attaching said camper side wall edges to said body side wall edges.

3. The combination of claim 2 wherein said camper side walls have front portions extending forwardly of said top edge of said windshield assembly.

4. The combination of claim 1 wherein said camper body module further comprises a pair of bunks in said compartment extension respectively attached to said camper side walls, said bunks extending rearwardly from adjacent said front wall and being spaced above said top edges of said windshield and door assemblies, one of said bunks being disposed above said operator's seat, said bunks being transversly spaced-apart thereby to permit egress from said operator's seat toward said rear end.

* * * * *